March 26, 1946.    J. H. VOWLESS    2,397,303
MECHANICAL SHOVEL ATTACHMENT FOR TRACTORS
Filed May 19, 1944    3 Sheets-Sheet 1
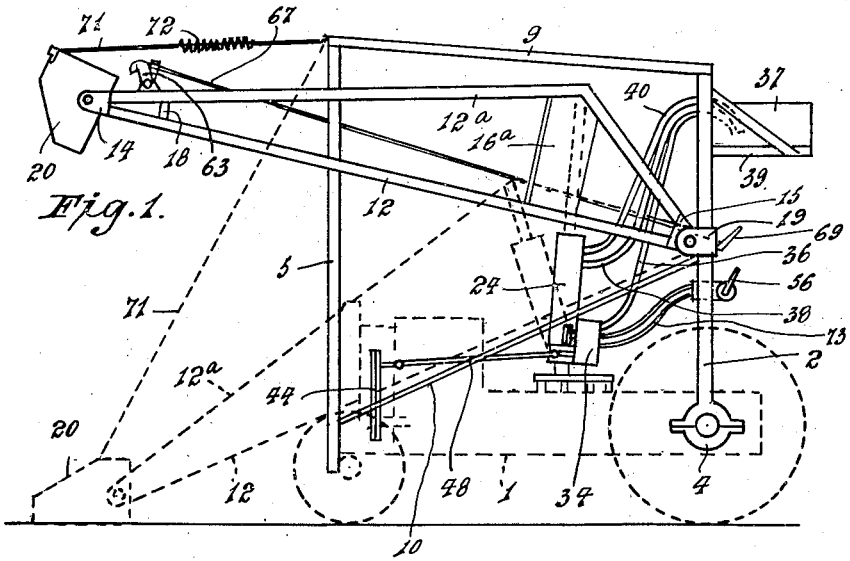
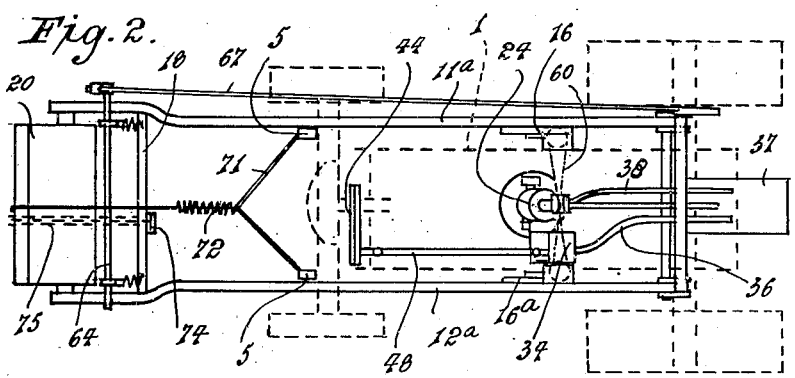
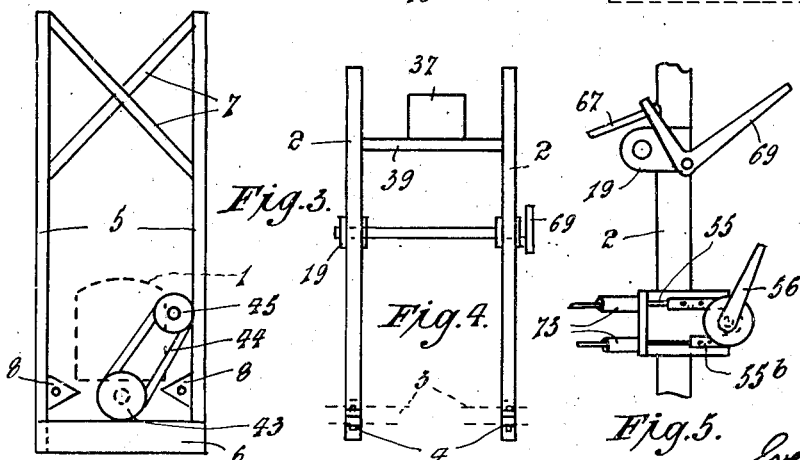
Inventor,
Jack H. Vowless
By Young, Emery & Thomp.
Attys.

March 26, 1946.  J. H. VOWLESS  2,397,303

MECHANICAL SHOVEL ATTACHMENT FOR TRACTORS

Filed May 19, 1944  3 Sheets-Sheet 2

Inventor,
Jack H. Vowless
By Young, Emery & Thorpe
Attys.

March 26, 1946. J. H. VOWLESS 2,397,303
MECHANICAL SHOVEL ATTACHMENT FOR TRACTORS
Filed May 19, 1944 3 Sheets-Sheet 3
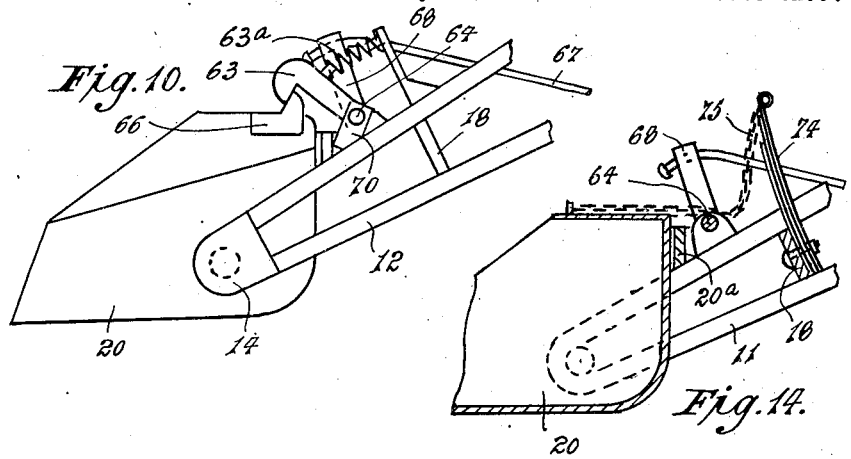
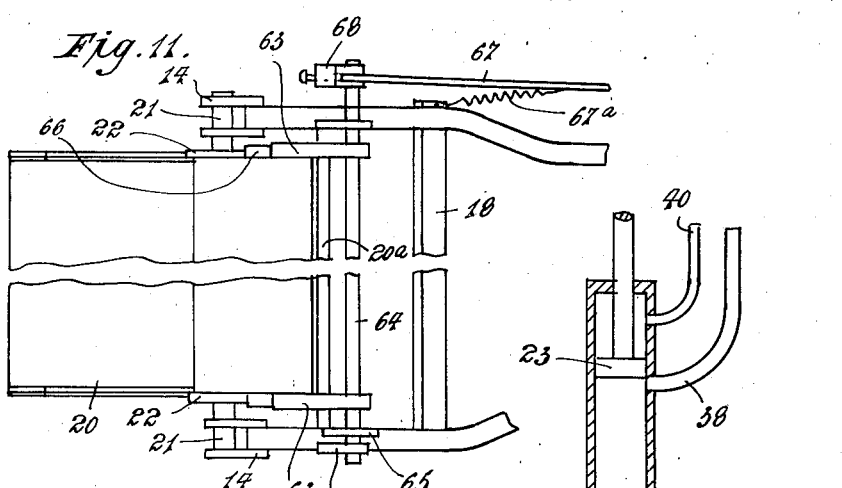
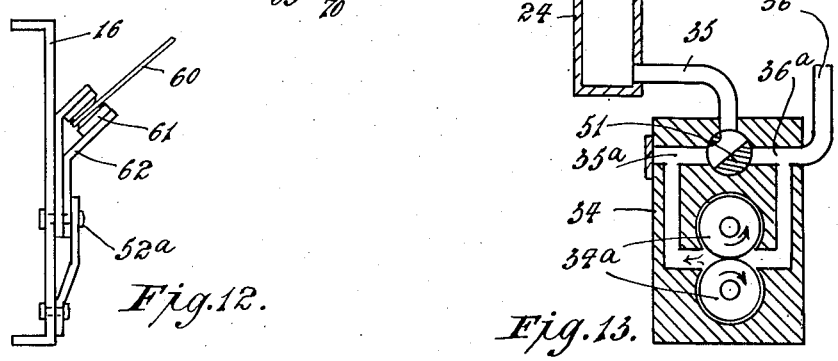
Inventor,
Jack H. Vowless
By Young, Emery, Thompson
Attys.

Patented Mar. 26, 1946

2,397,303

UNITED STATES PATENT OFFICE 2,397,303

MECHANICAL SHOVEL ATTACHMENT FOR TRACTORS

Jack Hosking Vowless, Te Kauwhata, New Zealand

Application May 19, 1944, Serial No. 536,387
In New Zealand May 21, 1943

1 Claim. (Cl. 214—140)

This invention relates to mechanical shovel attachments to tractors which are used in a large number of circumstances particularly concerned with earth shifting operations of different kinds.

The invention provides a construction and combination of parts comprising mechanism for lowering and raising a crane like jib carrying the shovel and in which the control operations are simply effected and a strong quick acting structure is obtained.

The essential feature of novelty in this invention comprises the use of hydraulic power as the means for operating the crane jib and the employment of means for controlling the actuating liquid (suitably a light oil) in the operations of the said hydraulic means. Other features of the invention are concerned with the mounting of the shovel scoop in the jib end and for the locking thereof and the releasing, to cause its filling and emptying.

The mechanism is designed to be operated in a manner to provide for the shovel being locked from tipping in the jib while the jib is lowered and for the tractor being driven forward into its job to cause the shovel to enter the earth with a scoop like action and then with the scoop raised to the required height for the tractor being moved to transfer its shovel's load to the required point and the shovel released to tip its load out over the front. The lowering of the jib restores the shovel to its scooping position and automatically locks it ready for a further series of operations.

In giving effect to the invention the crane forming jib is mounted on a suitable framing erected on the tractor so that the jib extends forwardly and is adapted to swing up and down in the line of the tractor and over the tractor front. A hydraulic ram is provided and the cylinder at its closed and lower end journalled on a suitable stand plate fixed in the framing so that its upper or head end is capable of swinging to and fro in the line of the jib. This ram extends generally in a vertical line about midway in the width of the crane jib which jib is made with two main longitudinal side bars disposed an approved distance apart. The ram head is connected to the jib frame so that the rising of the head and the lowering thereof in the operations of the ram, will cause the jib to be raised and lowered.

A pump is combined with the ram and such pump is driven from the engine of the tractor by suitable mechanism to provide for the pump being driven to force the liquid into the ram cylinder when the head is to be raised. The liquid supply is contained in a suitable tank and from this the pump draws its liquid to force into the ram and into this the ram exhausts as the ram is actuated in the manner characteristic of a hydraulic ram's operations, and raises and lowers the jib. These connections of the ram are controlled by means of a single valve.

The shovel, of scoop form, is pivoted between the forward ends of the side members of the jib frame in a manner to provide for its tipping but with its pivots disposed a slight extent to the rear of its centre of gravity so that its tendency is to swing down at its forward end. The front end of the shovel is connected by a rope with an overhead extension of the main frame which rope is so adjusted in length that when the jib is lowered, the shovel is raised by the pull of the rope. The rope may have a spring interposed in its length. Pawl catches are pivoted on the front end of the jib and these are designed to turn down by spring action and to engage the back edge of the shovel when such shovel is swung up on its pivots and to lock it against tipping forward. The pawls have a lever connection, with a rod attached thereto and extending back into the tractor. The other end of the rod has a hand lever associated therewith, by the manipulation of which the pawl may be operated to release the shovel when such is to be freed to tip out its contents. The main framing is so constructed that the jib is kept from swinging laterally in its up and down travel.

The invention will now be described with the aid of the accompanying drawings wherein:

Figure 1 is a side elevation and

Figure 2 is a plan showing the framing for the jib arranged on a tractor which is indicated in dotted lines.

Figure 3 is a view of the front members of the frame.

Figure 4 is a view of the rear members of the frame.

Figure 5 is a side view of the operating levers for controlling the pump and the tipping of the shovel.

Figure 10 is a side view and

Figure 11 is a plan of the shovel and the tipping means therefor.

Figure 12 is an end view of a swinging pulley for the flexible attachment between the ram and the jib frame.

Figure 13 is a view in diagrammatic form showing the valve control between the pump and the ram.

Figure 14 is a view showing a cushioning device for the shovel.

Figure 6:
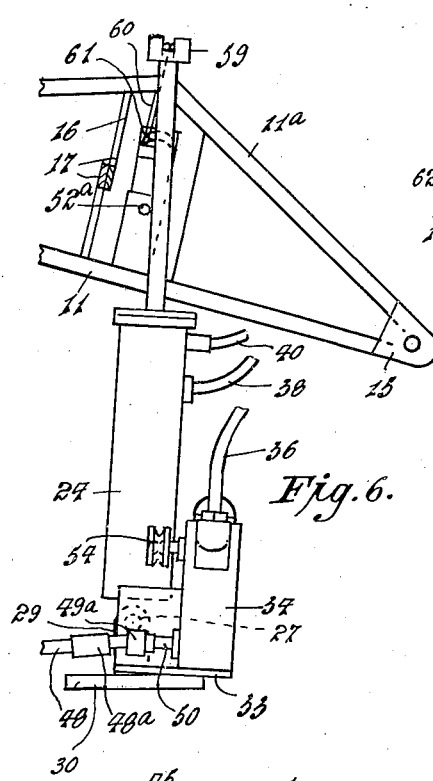
Figure 6 is a side view.

It will be seen by referring to Figures 1 to 4 of the drawings that a frame is erected on the tractor 1 (indicated by dotted lines) and is formed of uprights 2 attached at their ends to the rear axle housing 3 (also indicated by dotted lines) of the tractor in any suitable manner, for example in the way shown at 4 in Figure 1. Other uprights 5, joined by a lower cross plate 6 and diagonal straps 7, are attached to the front of the tractor in any convenient manner while webs 8 from the uprights are also attachable to the front of the tractor and further secure the uprights. Members 9 extend from the upper ends of the front uprights to the rear uprights while diagonal stays 10 from the front of the tractor on each side thereof to the rear uprights brace the frame so formed.

The jib frame is formed of side members 11, 11a and 12, 12a each pair of side members being joined at their front ends by angle plates 14 and at their rear ends by angle plates 15. Each upper side member 11a and 12a is formed with an angle from which plates 16 and 16a depend to respective lower members of the frame, these plates being joined by cross stays 17, see Fig. 7, while a cross stay 18 at the front end of the jib members completes the frame of the jib. The rear ends of the jib frame are journalled in bearing plates 19 attached to the rear uprights so that the front end of the jib may swing up and down in line with the tractor front the side members of the jib frame being on the exterior of the front uprights 5 in order to prevent lateral swing of the jib during its up and down movement. The shovel 20 of scoop-like form is pivoted at the front ends of the side members of the frame by means of stub axles 21 (see Figures 10 and 11) projecting inwards from the angle plates 14 and entering any approved form of bearing 22 secured to the side walls of the shovel, the pivoting being disposed a slight extent to the rear of the centre of gravity of the shovel so that the front end thereof will tend to swing downwards as shown in dotted lines Figure 1.

Figure 7:
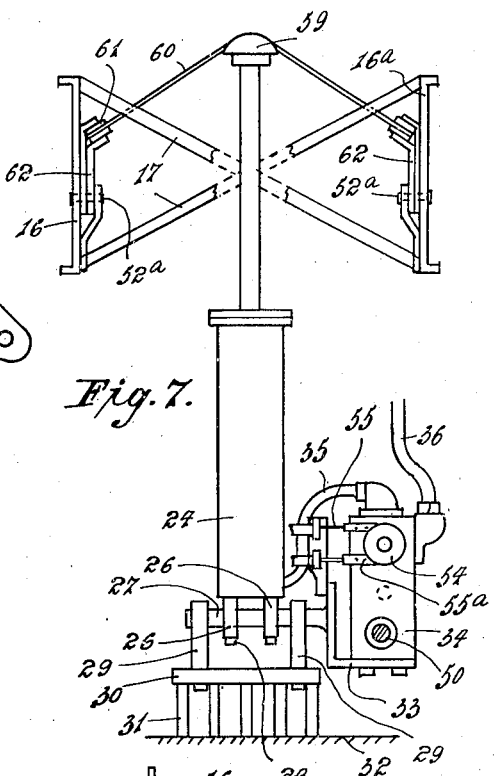
Figure 7 is a front view of the hydraulic ram and pump assembly, and also the flexible attachment between the ram and the jib frame.
Figure 9:
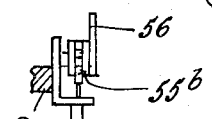
Figure 9 is a view showing the drive from the engine to the pump.
Figure 8:
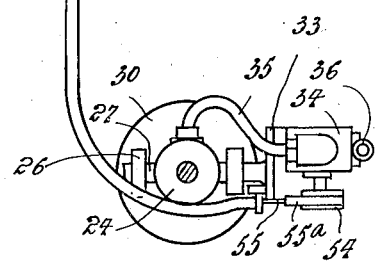
Figure 8 is a plan of the pump including the control lever therefor.

An hydraulic ram has the underside of its cylinder 24 provided with brackets 26, see Figure 7, by means of which it is mounted on a shaft 27 and secured thereon in a selected position by set screws 28. This shaft is journalled in bearing brackets 29 fixed to a stand plate 30 in turn fixed by suitable spacing blocks 31 to a part 32 of the tractor. One end of the shaft extends through a bearing bracket 29 and is welded to an angle plate 33 carrying a hydraulic pump 34. This pump has its outlet connected by suitable piping 35 to the lower end of the ram cylinder and its inlet by a suitable flexible pipe 36 to a tank 37 which contains the fluid for the ram preferably a light oil, and which is carried on supports 39 on the rear end of the framing. A pipe 38 leads from near the upper end of the cylinder to the tank 37 while a further pipe 40 from the upper end of the cylinder above the plunger enables oil above the plunger to return to the tank. The pump 34 is driven from the tractor engine by a pulley 43, see Figures 3 and 9, 43 attached to the side of the usual fan belt drive pulley indicated by dotted lines 42. The pulley 43 drives by means of belts 44 a pulley 45 on the end of the shaft 46 arranged in suitable bearings 47 attached to the tractor. A shaft 48 is connected by means of a universal shaft coupling 49 to the shaft 46, and to the drive spindle 50 of the pump by means of another universal coupling 49a. A sliding joint 48a is also arranged in the shaft 48 to allow for extension due to the movement of the pump 34.

The pump is of the usual geared type but is fitted with a valve 51, see Figure 13, adapted to by-pass the outlet side 35a of the pump to the inlet side 36a in order to control the rise or fall of the ram. This valve is of rotary form and has its spindle projecting through the pump casing and carrying a grooved sprocket wheel 54 thereon. Chains 55a connected to wire cables 55 pass over the wheel while the cables are carried through housings 73 and then attached to another chain 55b of a lever control 56. The action of the pump is that as the gears 34a rotate as indicated by the arrows in Figure 13 and the valve turned in the position shown, the oil will be forced along the pipe 35 and will raise the ram plunger 23 until it rises above the outlet of the pipe 38 whereupon the oil will flow through this pipe to the tank with the result that the ram will not rise higher. When the valve is rotated so that its port connects the outlet side 35a to the inlet side 36a the ram under the weight of its load will force the oil through the valve port and into the pipe 36 to the tank so that the ram plunger will fall while the pump is still running. By a partial opening of the valve the plunger may be raised to a desired height and held in that position. The speed at which the plunger descends may also be controlled by the valve.

The head 59 of the ram is connected to the jib frame by means of cables 60 crossing the head and passing around pulleys 61, see Figures 7 and 12, pivoted in plates 62 hinged on pins 52a in the plates 16 and 16a of the jib frame and thus provides a flexible and swinging connection between the ram and jib frame during the arcuate movement of the jib.

The shovel 20 is retained against a stop plate 20a on the jib arms in its working position and during the time that the jib frame is rising by pawls 63, see Figures 10 and 11, mounted on a spindle 64 pivoted in brackets 65 on the top members of the jib frame and adapted under the pressure of coil springs 63a to engage ratchet tooth like projections 66 on the upper edge of the shovel. For clearness the springs 63a are omitted from Figure 11. The pawls are disengaged from the projections 66 by means of a rod 67 which slides through a lever 68 on the spindle 64 and which is carried to the rear of the framing where it is attached to a hand lever 69, see Figure 5, so as to be close to the operator. A spring 67a attached to the rod and to the stay 18 will return the rod to the position shown in Figure 14, so as not to restrict the free movement of the pawls. By manipulating this lever the pawls 63 can be disengaged and the shovel will then tip and so discharge its contents. The pawls are prevented from moving beyond the position in Figure 10 by means of a stop 70 fixed on the spindle 64 and striking against the upper face of an upper jib member. A rope 71, see Figure 1 or 2, is also attached to the upper side of the shovel and to the upper ends of the front uprights and is of a length that as the jib frame is lowered the shovel is returned to working position and the pawls again engage the projections 66. A coil spring 72 may encircle the rope in order to take up the slack when the jib is raised.

During the operation of loading, the shovel will be in its lowered position and the tractor driven forward to cause the shovel to enter the earth, gravel or the like with a scoop like action. When the shovel is loaded the operator by means of the hand lever 56 rotates the valve 51 to the position shown in Figure 13 to permit the oil to be forced into the lower end of the ram cylinder. The ram thereupon rises and by means of the cables 60 raises the jib frame, the movement continuing until the ram reaches its full height, governed by the outlet from its cylinder to the pipe 38, and the frame assuming its raised position as shown in Figure 1. The tractor can now be driven where desired for the depositing of the load and the operator releases the pawl 63 from the projections 66 by means of the hand lever 19 thus permitting the shovel to tip downwards and discharge its contents. The tractor is then driven back to the position for the next load the operator moving the lever 56 in the reverse direction and thus rotates the valve wheel 54 and the valve 51 to a position that will permit oil to flow from the ram cylinder through the valve 51 to the pipe 36 thus permitting the ram to fall and the jib to be lowered. When the lowered position has been nearly reached the rope 71 returns the shovel to working position (dotted lines Figure 1) the pawls 63 falling into place over projections 66 and the shovel is ready for the tractor to be driven forwards to again load the shovel.

A number of spring leaves 74, see Figure 14, may be bolted to the cross stay 18 of the jib frame while a chain 75 is attached to the upper end and carried downwards and attached to the shovel. This arrangement cushions the fall of the shovel when it is released by the pawls.

I claim:

In a tractor, a main frame, an engine mounted in said frame, a jib frame pivoted at the rear of said main frame, hydraulic ram means to raise the jib frame, means to operate the said ram means from the said engine, a scoop-like shovel pivoted at the front end of the jib frame, projections on said shovel, a spindle journalled in the jib frame, pawls fixed to the spindle and adapted to engage said projections on the shovel, a lever on the end of the spindle to which the rod is connected, a stop on said spindle to engage the frame and limit the rising of the pawls, spring leaves attached to the jib frame behind the shovel, and a chain extending from the leaves to the shovel.

JACK HOSKING VOWLESS.